United States Patent [19]

Smith

[11] Patent Number: 4,856,075
[45] Date of Patent: Aug. 8, 1989

[54] IMAGE DISCRIMINATION
[75] Inventor: Craig M. Smith, Rochester, N.Y.
[73] Assignee: Eastman Kodak Company, Rochester, N.Y.
[21] Appl. No.: 104,694
[22] Filed: Oct. 5, 1987
[51] Int. Cl.[4] .............................................. G06K 9/36
[52] U.S. Cl. .................................... 382/50; 358/443; 382/9
[58] Field of Search ....................... 382/50, 9; 358/282, 358/283, 280

[56] References Cited

U.S. PATENT DOCUMENTS

| | | | |
|---|---|---|---|
| 4,194,221 | 3/1980 | Stoffel | 358/283 |
| 4,447,830 | 5/1984 | Stoffel | 358/283 |
| 4,554,593 | 11/1985 | Fox et al. | 358/282 |
| 4,577,235 | 3/1986 | Kannapell et al. | 358/280 |
| 4,668,995 | 5/1987 | Chem et al. | 358/282 |

Primary Examiner—Leo H. Boudreau
Assistant Examiner—Iris Ashley
Attorney, Agent, or Firm—Milton S. Sales

[57] ABSTRACT

Apparatus and method for discriminating between regions of text and continuous tone regions of mixed format documents and for selecting print/no-print decisions to be made by either an image processing algorithm optimized for text or an image processing algorithm optimized for continuous tone. A video signal of digital values indicative of pixels representing the image content of the document is generated. The video signal is applied to a two-level threshold discrimination network, to a processor having the text algorithm, and to a processor having the continuous tone algorithm. The continuous tone image processing algorithm is selected (1) when the video signal is above the lower discrimination threshold and the decision of the text algorithm is to print and (2) when the video signal value is below the upper discrimination threshold and the decision of the text algorithm is to not print. The text image processing algorithm is selected under any other condition.

4 Claims, 2 Drawing Sheets

IMAGE DISCRIMINATION

BACKGROUND OF THE INVENTON

1. Field of the Invention

This invention relates generally to processing image data obtained by scanning a document; and more particularly to discriminating between text material, halftone material, and continuous tone material in mixed format documents so that the image data may be appropriately processed.

2. Description of the Prior Art

Image processing for electronic copying or facsimile transmission is well know in the prior art. An original document is scanned to produce a video signal representative of the image. The video signal is next processed to optimize the reproduction.

Generally, text and and low frequency halftone material (herein collectively referred to as text material) are processed with different algorithms than continuous tone and high frequency halftone material (herein referred to collectively as continuous tone material). Text material is optimized by a processing algorithm which results in sharp edge definition, high contrast, and high frequency detail rendition. Continuous tone material is optimized by an algorithm which results in good gray scale reproduction and only moderate detail rendition. The algorithms which are optimized for one type of material generally yield results which are marginal to poor on the other type of material.

Prior art methods to switch between algorithms optimized for text and those optimized for continuous tone reproduction include those which discriminate based on the video signal level. The video signal is passed through a two-level discrimination threshold network. Signals above the upper discrimination threshold or below the lower discrimination threshold are processed by the text image processing algorithm, while signals falling between the two levels are processed by the continuous tone image processing algorithm.

While this system is generally accurate, it fails in certain instances wherein the text image processing algorithm is chosen erroneously. Such instances are reduced by the apparatus and method of the present invention.

SUMMARY OF THE INVENTION

In accordance with the present invention, a discrimination is made between text and continuous tone regions of mixed format documents so that a selection can be made between print/no-print decisions made by an image processing algorithm optimized for text or an image processing algorithm optimized for continuous tone. A video signal representative of the image content is applied to a two-level discrimination threshold network. The continuous tone image processing algorithm is seleted when either (1) the video signal is above the lower discrimination threshold and the decision of the text algorithm to print or (2) the video signal is below the upper discrimination threshold and the decision of the text algorithm is to not print. The text image processing algorithm is selected under any other condition. Put another way, the continuous tone algorithm is selected if the video signal level is between the two discrimination threshold levels or if the signal disagrees with the output of the text algorithm.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
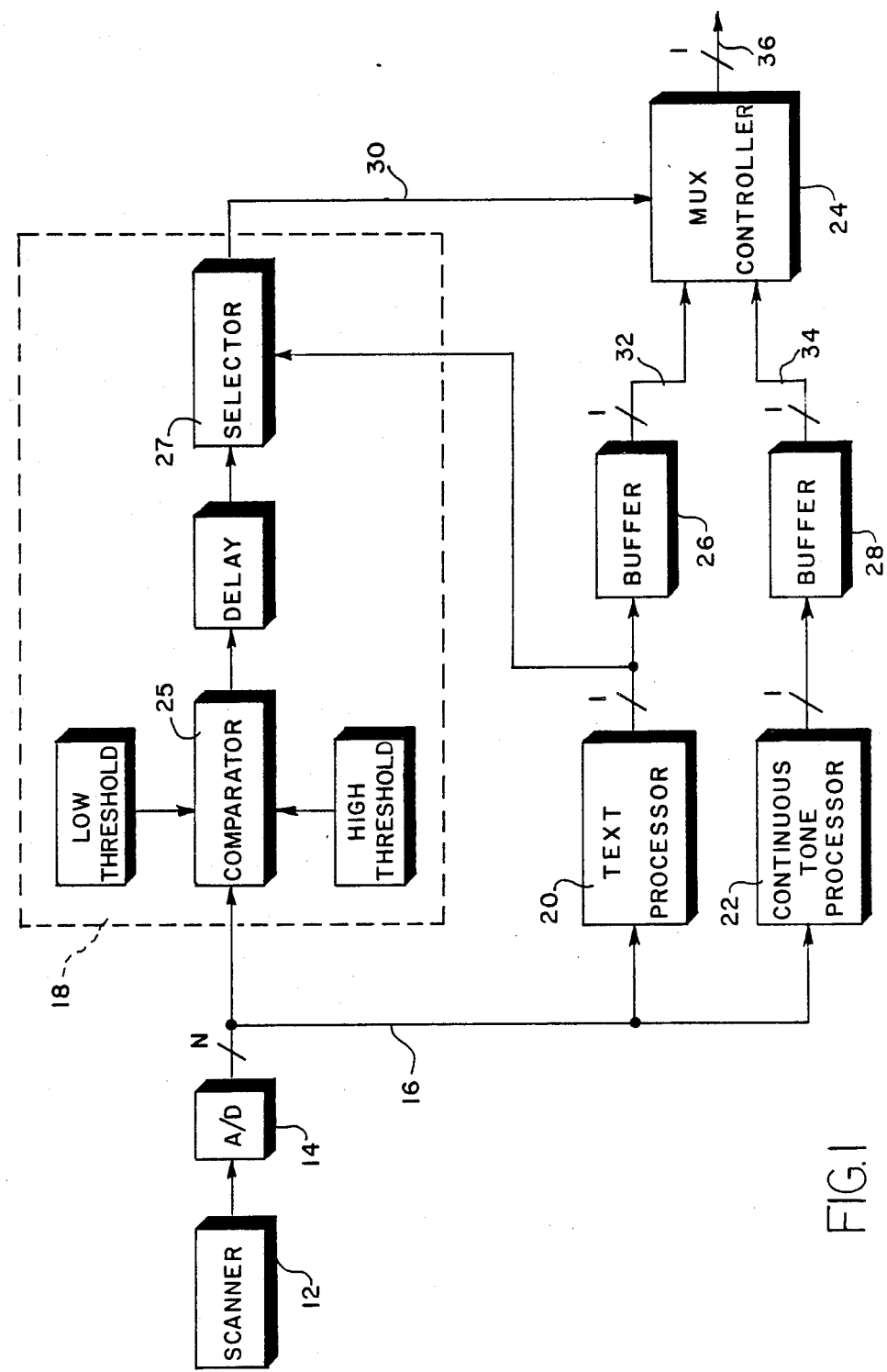
FIG. 1 shows, in block diagram form, image processing apparatus according to a preferred embodiment of the present invention.

Referring to FIG. 1, a document scanner 12 makes successive line scans across a document to generate a video signal of values indicative of pixels. Each individual pixel each comprises a discrete voltage representation of the image density of an area of the document, the various voltage levels forming a relative measure of the image gray scale. The voltage representation is digitized at an analog-to-digital converter 14 into N-bit per pixel words. In content, the image on the document may be composed entirely of text, low frequency half tone, high frequency halftone, continuous tone, or combinations thereof.

The output of analog to digital converter 14 is coupled by a bus 16 to a discrimination network 18, a processor 20 having an image processing algorithm optimized for text, and a processor 22 having an image processing algorithm optimized for continuous tone. The outputs of processors 20 and 22 are coupled to a controller 24 through buffers 26 and 28, respectively, which temporarily store processed pixels pending a determination by discrimination network 18 of whether, due to image content, processing by either text processor 20 or continuous tone processor 22 is desirable. The output of controller 24 is coupled to a data recipient.

Text processor 20 comprises any suitable algorithm effective to image process the pixel being examined in a manner optimum for text material. For example, processor 20 may provide a single level threshold against which the pixel being examined is compared. Continuous tone processor 22 comprises an algorithm effective to image process the pixel being examined in a manner optimum for continuous tone material. In either case, the output of the processors are print/no-print decisions for black/white reproduction, respectively.

Threshold network 18 includes a comparator 25 which compares the pixel values to high (white) and low (black) threshold values. Of course the polarity of video signals and the color of print have no effect on the algorithm. If the signal is of density, high values would represent black.

If the pixel value is between the discrimination threshold values, a selector 27 instructs controller 24 to select continuous tone processor 22. If the pixel value is outside the threshold values, the preliminary decision is to use text processor 20, but that decision can be overridden as explained below.

Figures 2, 3:
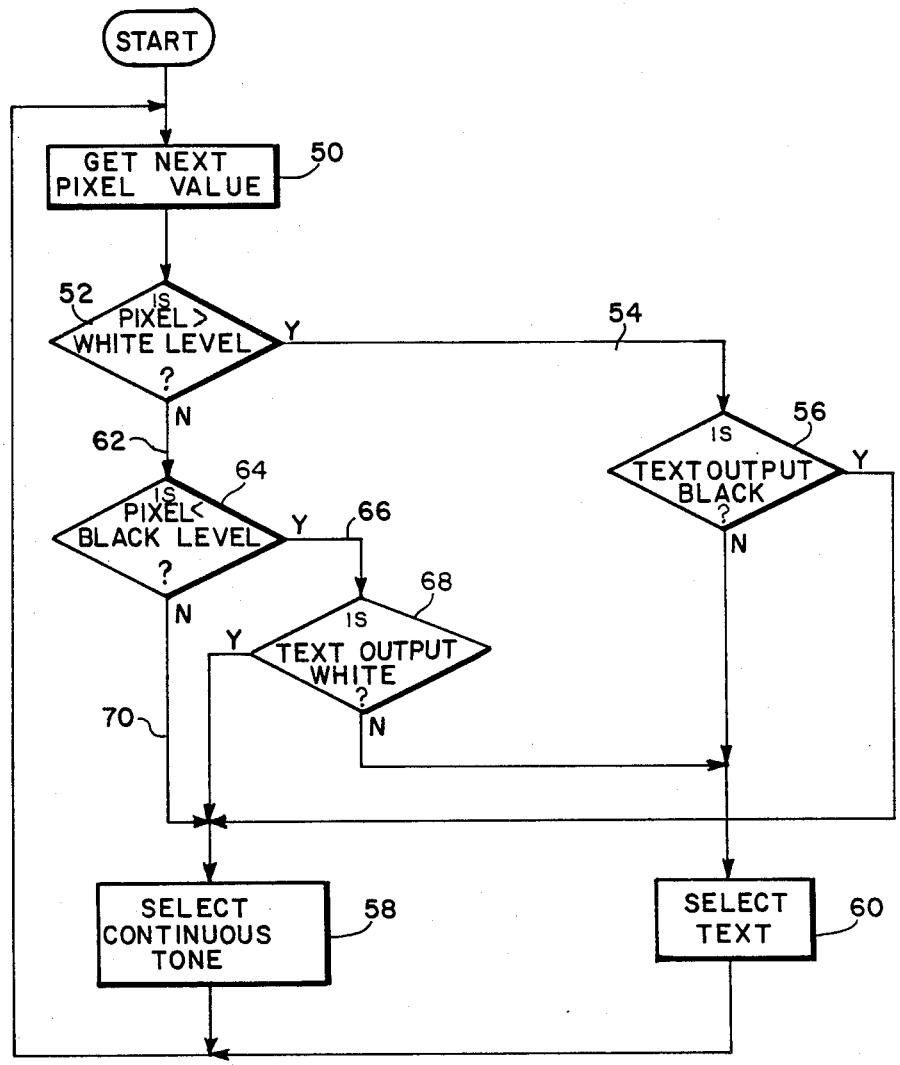
FIG. 2 is a graphical representation of a discriminator threshold values.
FIG. 3 is a flowchart of the process by which the discrimination of the image is made.

FIG. 2 is a graphic representation of the electrical signals on bus 16 representative of the image being processed. The graph is useful in understanding the conditions used by the invention to make a preliminary decision detecting text and continuous tone areas of the document. FIG. 2 shows video values for a portion of a scanned line. The video values are thresholded at an upper value 40 and a lower value 42 to distinguish text material from continuous tone material. Signals between the two threshold values 40 and 42 are considered to be continuous tone material, signals above threshold value 40, in the illustrative embodiment, are conditionally considered to be no-print, or white, text material, signals below threshold value 42 are conditionally considered to be print, or black, text material.

There are many instances in continuous tone image processing when a pixel's video value will be outside threshold values 40 or 42; even though the image portion in which the pixel occurs is indeed a continuous tone one. For example, if text processor 20 is adaptive, its threshold value tracks the density of the document. High density documents may result in a text black/white threshold level below value 42 of FIG. 2. Accordingly, processor 20 could produce a white signal while discriminator comparator 25 produces a black test signal. The existence of a signal from comparator 25 that threshold value 42 was exceeded (white text) for a pixel, together with a signal from text processor 20 that the pixel is print, is treated as an indication that the pixel should be processed by continuous tone processor 22. Likewise, the existence of a signal from comparator 25 that threshold value 40 was exceeded (black text) for a pixel, together with a signal from text processor 20 that the pixel is no-print, is also treated as an indication that the pixel should be processed by continuous tone processor 22.

FIG. 3 is a flowchart showing process steps to be followed by the system according to the present invention to process mixed format documents. A conventional microprocessor, a programmable logic array, or discrete logic could be implemented to perform the functions shown in the flowchart.

In FIG. 3, the first block 50 is a connector block through which the pixel of interest enters into a decisional block 52. In block 52, the pixel is tested to determine whether its video level is greater than the upper, i.e. white, threshold level 40 of FIG. 2. If the pixel is white, the logic exits the decisional block along path 54 into a decisional block 56. In decisional block 56, the system tests to determine whether the output of text processor 20 (FIG. 1) is black. If the output of test processor 20 is black, the program enters a function block 58 to select continuous tone processor 22 for the pixel. If the output of text processor 20 is white, the program enters a function block 60 to select text processor 20 for the pixel.

If the decision from decisional block 52 was "no" instead of "yes," then the logic exits block 52 along a path 62 into a decisional block 64. In block 64, the pixel is tested to determine whether its video level is less than the lower, i.e. black, threshold level 42 of FIG. 2. If the pixel is black, the logic exits the decisional block along path 66 into a decisional block 68. In decisional block 68, the system tests to determine whether the output of text processor 20 (FIG. 1) is white. If the output of text processor 20 is white, the program enters function block 58 to select continuous tone processor 22 for the pixel. If the output of text processor 20 is black, the program enters function block 60 to select text processor 20 for the pixel.

If the decision from decisional block 64 was "no" instead of "yes" (the video value of the pixel falls between threshold values 40 and 42), then the logic exits block 64 along a path 70 into function block 58 to select continuous tone processor 22 for the pixel. From function blocks 58 and 60, the program loops to fetch another pixel.

By the present invention, of which a preferred embodiment has been described herein, a discrimination network is provided to decide when the text algorithm is generating a valid output and when the text output is questionable and may be replaced by the output of the continuous tone algorithm. A continuous tone decision is given anytime the text output is no-print when the video value is below the upper threshold value, or when the text output is print when the video value is above the lower threshold value.

The invention has been described in detail with particular reference to preferred embodiments thereof, but it will be understood that variations and modifications can be effected within the spirit and scope of the invention.

What is claimed is:

1. A method for discriminating between regions of text and continuous tone regions of mixed format documents and for selecting print/no-print decisions to be made by an image processing algorithm optimized for text or an image processing algorithm optimized for continuous tone, said method comprising the steps of:
   generating a video signal of values indicative of pixels representing the image content of the document;
   passing said video signal through a two-level discrimination having a low and a high threshold value;
   applying said video signal to first and second image processors having, respectively, the text image processing algorithm and the continuous tone image processing algorithm for making print/no-print decisions;
   selecting the second image processor when the video signal is above the lower threshold value and the decision of the first image processor is to print;
   selecting the second image processor when the video signal value is below the upper threshold value and the decision of the first image processor is to not print; and
   selecting the first image processor under any other condition.

2. A method for discriminating between regions of text and continuous tone regions of mixed format documents and for selecting print/no-print decisions to be made by an image processing algorithm optimized for text or an image processing algorithm optimized for continuous tone, said method comprising the steps of:
   generating a video signal of values indicative of pixels representing the image content of the document;
   passing said video signal through a two-level discrimination network having a comparator with a low and a high threshold value;
   applying said video signal to first and second image processors having, respectively, the text image processing algorithm and the continuous tone image processing algorithm for making print/no-print decisions;
   selecting the continuous tone image processing algorithm when the video signal is above the lower threshold value and the decision of the text algorithm is to print;
   selecting the continuous tone image processing algorithm when the video signal value is below the upper threshold value and the decision of the text algorithm is to not print; and selecting the text image processing algorithm under any other condition.

3. Apparatus for discriminating between regions of text and continuous tone regions of mixed format documents and for selecting print/no-print decisions to be made by either an image processing algorithm optimized for text or an image processing algorithm optimized for continuous tone, said apparatus comprising:

means for generating a video signal of values indicative of pixels representing the image content of the document;

a two-level comparator having a low and a high threshold value;

first and second image processors having, respectively, the text image processing algorithm, and the continuous tone image processing algorithm;

means for applying the video signal to said comparator, and to said first and second image processors; and means for selecting (1) the second image processor when the video signal is above the lower threshold value and the decision of the first image processor is to print, (2) the second image processor when the video signal value is below the upper threshold value and the decision of the first image processor is to not print, and (3) the first image processor under any other condition.

4. Apparatus for discriminating between regions of text and continuous tone regions of mixed format documents and for selecting print/no-print decisions to be made by an image processing algorithm optimized for text or an image processing algorithm optimized for continuous tone, said apparatus comprising:

means for generating a video signal of values indicative of pixels representing the image content of the document;

a discrimination network with a two-level comparator having a low and a high threshold value;

first and second image processors having, respectively, the text image processing algorithm, and the continuous tone image processing algorithm;

means for applying the video signal to said discrimination network and to said first and second image processors; and means for selecting (1) the continuous tone image processing algorithm when the video signal is above the lower threshold value and the decision of the text algorithm is to print, (2) the continuous tone image processing algorithm when the video signal value is below the upper threshold value and the decision of the text algorithm is to not print, and (3) the text image processing algorithm under any other condition.

* * * * *